(12) United States Patent
Goland

(10) Patent No.: US 7,509,378 B2
(45) Date of Patent: Mar. 24, 2009

(54) SYSTEM AND METHOD FOR MESSAGE ORDERING IN A MESSAGE ORIENTED NETWORK

(75) Inventor: Yaron Y. Goland, Seattle, WA (US)

(73) Assignee: Bea Systems, Inc., San Jose, CA (US)

( * ) Notice: Subject to any disclaimer, the term of this patent is extended or adjusted under 35 U.S.C. 154(b) by 835 days.

(21) Appl. No.: 10/796,760

(22) Filed: Mar. 9, 2004

(65) Prior Publication Data

US 2004/0205141 A1    Oct. 14, 2004

Related U.S. Application Data

(60) Provisional application No. 60/453,603, filed on Mar. 11, 2003.

(51) Int. Cl.
*G06F 15/16* (2006.01)
(52) U.S. Cl. .................. 709/206; 709/203; 709/207; 709/245; 370/394; 455/412.11
(58) Field of Classification Search ............ 709/206, 709/245, 203, 207; 370/394; 455/412.1
See application file for complete search history.

(56) References Cited

U.S. PATENT DOCUMENTS

| | | | | |
|---|---|---|---|---|
| 5,588,117 | A * | 12/1996 | Karp et al. ............ 709/232 |
| 5,617,538 | A * | 4/1997 | Heller .................. 709/245 |
| 5,944,788 | A * | 8/1999 | Krantz et al. .......... 709/213 |
| 6,128,283 | A * | 10/2000 | Sabaa et al. ........... 370/236 |
| 6,447,097 | B1 * | 9/2002 | Folkins et al. ......... 347/40 |
| 6,493,343 | B1 * | 12/2002 | Garcia et al. .......... 370/394 |
| 6,643,650 | B1 * | 11/2003 | Slaughter et al. ....... 707/10 |
| 6,658,004 | B1 * | 12/2003 | Kadansky et al. ....... 370/394 |
| 6,775,707 | B1 * | 8/2004 | Bennett et al. ......... 709/233 |
| 6,839,752 | B1 * | 1/2005 | Miller et al. ........... 709/224 |
| 6,883,014 | B1 * | 4/2005 | McErlean .............. 709/202 |
| 6,886,044 | B1 * | 4/2005 | Miles et al. ............ 709/238 |
| 6,898,422 | B2 * | 5/2005 | Bern et al. ............. 455/412.1 |
| 7,010,573 | B1 * | 3/2006 | Saulpaugh et al. ....... 709/206 |
| 7,031,308 | B2 * | 4/2006 | Garcia-Luna-Aceves et al. . 370/390 |
| 7,039,914 | B2 * | 5/2006 | Potter, Jr. ............. 718/102 |
| 7,203,658 | B1 * | 4/2007 | Gidwani et al. ......... 705/26 |
| 7,240,097 | B2 * | 7/2007 | Holdsworth et al. ..... 709/207 |
| 7,269,665 | B2 * | 9/2007 | Pauly et al. ........... 709/246 |
| 2001/0042099 | A1 * | 11/2001 | Peng .................... 709/206 |
| 2002/0042830 | A1 * | 4/2002 | Bose et al. ............. 709/230 |
| 2002/0091846 | A1 * | 7/2002 | Garcia-Luna-Aceves et al. . 709/230 |
| 2002/0120717 | A1 * | 8/2002 | Giotta ................... 709/219 |

(Continued)

OTHER PUBLICATIONS

Currie, David; "Grouping messages using the WebSphere MQ Java and JMS APIs," IBM, printed Aug. 2007, pp. 1-9.*

(Continued)

*Primary Examiner*—Alina N. Boutah
*Assistant Examiner*—Nathan J. Flynn
(74) *Attorney, Agent, or Firm*—Fliesler Meyer LLP

(57) ABSTRACT

A system and method for message ordering in a message oriented network. Sequencing groups of messages is an act that is completely orthogonal to the service/port/operation hierarchy of any of the participants. By separating the two, the invention eliminates making message ordering subordinate to the conversation scope, and replaces it with an ordering that is actually orthogonal to the conversation and/or class factory scope.

33 Claims, 4 Drawing Sheets

U.S. PATENT DOCUMENTS

| | | |
|---|---|---|
| 2002/0152299 A1* | 10/2002 | Traversat et al. ............ 709/223 |
| 2002/0152315 A1 | 10/2002 | Kagan et al. |
| 2002/0191796 A1 | 12/2002 | Muschenborn |
| 2003/0061389 A1* | 3/2003 | Mazza ........................ 709/248 |
| 2003/0093576 A1 | 5/2003 | Dettinger et al. |
| 2003/0110227 A1* | 6/2003 | O'Hagan .................... 709/206 |
| 2003/0110230 A1* | 6/2003 | Holdsworth et al. ........ 709/207 |
| 2003/0212820 A1* | 11/2003 | deCarmo .................... 709/238 |
| 2004/0010538 A1* | 1/2004 | Miller et al. ................ 709/201 |
| 2004/0083263 A1* | 4/2004 | Richardson et al. ......... 709/204 |
| 2004/0103196 A1* | 5/2004 | Block et al. ................. 709/227 |
| 2004/0230652 A1* | 11/2004 | Estrada et al. .............. 709/204 |
| 2007/0067383 A1* | 3/2007 | Savchenko et al. .......... 709/203 |

OTHER PUBLICATIONS

"Group Communications," printed from: www.cs.cityu.edu.hk/~lwang/wlect1.ppt, 2008.*

Checha Kim and Jai Yong Lee: "Message Ordering in Multicast Communication," IEEE 1993.*

MH & nmh: Email for Users & Programmers: "More about Sequences," May 2006.*

International Search Report, in connection with PCT/US2004/07367 dated Apr. 20, 2005, 8 pages.

* cited by examiner

SYSTEM AND METHOD FOR MESSAGE ORDERING IN A MESSAGE ORIENTED NETWORK

CLAIM OF PRIORITY

This application claims priority to U.S. Provisional Patent Application 60/453,603, filed Mar. 11, 2003 entitled "SYSTEM AND METHOD FOR MESSAGE ORDERING IN A MESSAGE ORIENTED NETWORK", and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to application servers and communication systems, and particularly to a system and method for message ordering in a message oriented network.

BACKGROUND

A problem with existing communications and network systems is that sometimes it is desirable to ensure that messages sent from a sender are processed in the appropriate order by the receiver. In an asynchronous multi-hop network this can sometimes be a difficult task. For example, as shown in FIG. 1, a network environment 100 may include a set of messages S1 (104), S2 (108), that may travel from the sender S (102), via an intermediary I (106), to the receiver R (110):

S—>I—>R

It is possible that the intermediary I, for any number of reasons, may re-order the messages it receives such that it forwards message S2 before it forwards message S1. The result is that receiver R would first receive message S2 and would then receive message S1, which is not the order that sender S had originally intended. In the general case the intermediary I can represent an entire network of intermediaries that could include for example generic intermediaries, firewalls, proxies, mail servers and any other system able to relay a message.

In order to work around this problem it is necessary for the sender S to mark its messages in such a manner that R can determine what their intended order is, and then process the messages in that order. A typical solution to this problem is to include an incrementing integer within S's messages such that the first message will start, typically at a value 0, and the next message will have the value 1, and so on. However, anyone implementing this solution quickly discovers that they have a context problem. For example, assume that S and R are participating in two different sets of message exchanges, the first regarding a purchase order and the second regarding a status request. These two exchanges are completely independent of each other and could be safely processed in parallel. However, by definition using a sequence number requires all of the messages to be processed serially, so it will not be possible to process them in parallel if only one integer is used on both conversations.

FIG. 2 shows an example of a message sequence 120 that includes an incrementing integer. For example, consider that the conversation regarding purchase orders generates messages SP1, SP2 and SP3. Consider also that the conversation regarding status requests generates messages SR1 and SR2. If a single message ID is being used, then the messages (122-130) will be stamped as they leave S, generating a sequence something like that shown in FIG. 2:

SP1+1, SP2+2, SR1+3, SP3+4, SR2+5 where the value "+N" in each message represents the sequence number for that particular message set.

In the above example, even though the SP messages and the SR messages could be processed in parallel (since they have nothing to do with each other), in practice they won't be because the sequence counter requires them to be generated in the order marked.

Another approach that some message ordering solutions take is to allow the sequence number to be associated with some form of conversation ID or similar identifier. FIG. 3 shows an example of a message sequence 140 that uses conversation ID's. When a conversation ID is being used, then the messages (142-150) will be stamped as they leave S, generating a sequence something like that shown in FIG. 3:

SP1+C1+1, SP2+C1+2, SR1+C2+1, SP3+C1+3, SR2+C2+2 where the value "+CN+Y" in each message represents the conversation ID and sequence number. The sequence number is 'scoped' to the conversation identifier so that it is no longer sufficient to specify just, e.g. 'sequence ID 1'—it is now necessary to also specify "sequence ID 1 in conversation 1'. With the introduction of a conversation identifier it is possible for S and R to hold multiple, simultaneous conversations that can be processed completely independently of each other, and wherein each conversation is individually ordered.

At this point traditional messaging algorithms have to perform some cleanup work. Typically, they will specify what the first identifier number is (usually 0) so that the receiver knows when a conversation starts. They will also specify the maximum size of the integer used for the conversation ID. Finally, they will also specify how to behave when the integer rolls over, i.e. if the maximum integer size is 999 then what to do when 999 messages have been sent. The typical behavior is to start counting at 0 but to also include a flag that says "I am a rollover" to indicate that this isn't a 'true' 0 message but is the result of a rollover. Traditional systems will usually also include an explicit way to reset the counter, i.e. a message can be sent with a '0' and a flag saying "I am resetting the counter to 0". There is usually also some form of associated timer whose meaning is 'if you don't receive another message in the conversation by time X then you can forget about the conversation.' This is important in an asynchronous unreliable network where the receiver may fail/crash or the network may stop working, and in these instances it is undesirable to be stuck holding a lot of state that may never be used.

The traditional approaches described above suffer from a number of flaws. First of all, especially when applied to the world of Web Services, conversation IDs are a particularly bad idea. The Web Services world includes the concept of a service which is broken down into ports, which are themselves then broken down into operations. This structure demands three levels of abstraction and is difficult to manage because one must deal with various features applying at one or more combination of the levels. For example, if you want to configure that messages must be sent over SSL does that configuration apply at the service level, the port level, the operation level, or at some combination of the three levels? Dealing with these issues has proven extremely challenging for users and has made Web Services more difficult to use.

The use of conversations makes the situation worse by adding a fourth level to the hierarchy. Now the system must deal with service, port, operation, and conversation levels. If someone configures a security setting requiring SSL is that at the Service, Port, Operation or the Conversation level? To complicate matters—unlike the Service/Port/Operation hierarchy where each parent completely contains its children (for example, an operation belongs to exactly one port which belongs to exactly one service), the same is not true for conversations. Messages in a single conversation may need to occur across multiple operations or ports although typically they are required to be scoped to a single service. So the configuration issue gets even worse because not only do you have to configure information at four different levels of abstraction but one of those levels—the conversations level—itself crosses two other levels of abstraction.

The conversation model also fails when it comes to message ordering. For example, what happens if S and R need to sequence messages in two different conversations? What happens if messages within a conversation do not all need to be ordered? What happens if you need to sequence messages between more than two participants (for example A sends messages to B who sends messages to C) and there needs to be a global order? The Conversation plus sequence number model cannot deal with any of these scenarios.

SUMMARY

The invention relates generally to application servers and communication systems, and particularly to a system and method for message ordering in a message oriented network. Sequencing groups of messages is an act that is completely orthogonal to the service/port/operation hierarchy of any of the participants. By separating the two, the invention eliminates making message ordering subordinate to the conversation scope, and replaces it with an ordering that is actually orthogonal to the conversation and/or class factory scope.

DETAILED DESCRIPTION

The invention provides a system and method for message ordering in a message oriented network. In accordance with an embodiment, the invention utilizes a design pattern called the class factory model to provide an improved means of message ordering. As applied to the world of Web Services, what is really desired is for sender S to send a message to receiver R saying, e.g. "I need to create a new instance of the Web Services Calculate Shipping Charges, please send me the URI for the new instance". In this case each shipping order that S wants R to handle will be represented by a new Web Service with its own URI. This requires no explicit conversation ID, nor is there any new level in the Service/Port/Operation hierarchy. With this simple and well understood class factory design pattern, one is able to solve the problems that conversations were intended to solve, but without any of the complications previously described.

An initial concern was that messages sent between sender S and receiver R needed to be sequenced, so a sequence ID was introduced. While realizing that there could be different sequences between S and R that were independent of each other, the invention takes advantage of the conversation construct to separate them. The conversation construct can be removed and replaced with a class factory construct. Therefore, depending on the implementation, it is possible to go back to having sequence numbers by themselves in messages since the 'scope' represented by a child of the class factory is identical to the 'scope' provided by a conversation. So, if we want to be as expressive as the old conversation+sequence ID construct then we can just introduce class factory instances plus a sequence ID.

Sequence Group Identifiers

In accordance with an embodiment of the invention, the key to the algorithm is to recognize that sequencing groups of messages is an act that is completely orthogonal to the service/port/operation hierarchy of any of the participants. This is the fundamental error made in using conversations with message ordering. By associating these two, message ordering was made subordinate to the conversation scope. However, message ordering is actually orthogonal to the conversation and/or class factory scope.

Figure 1:
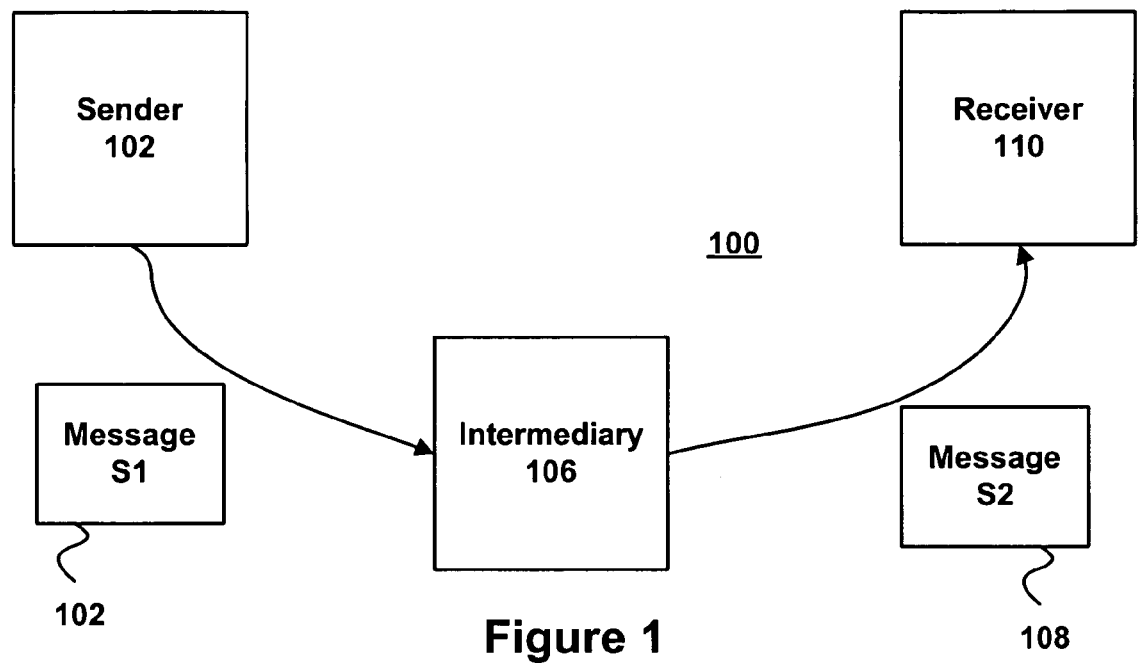
FIG. 1 shows an example of a multi-hop network including a message sender, receiver, and intermediary.
Figure 2:
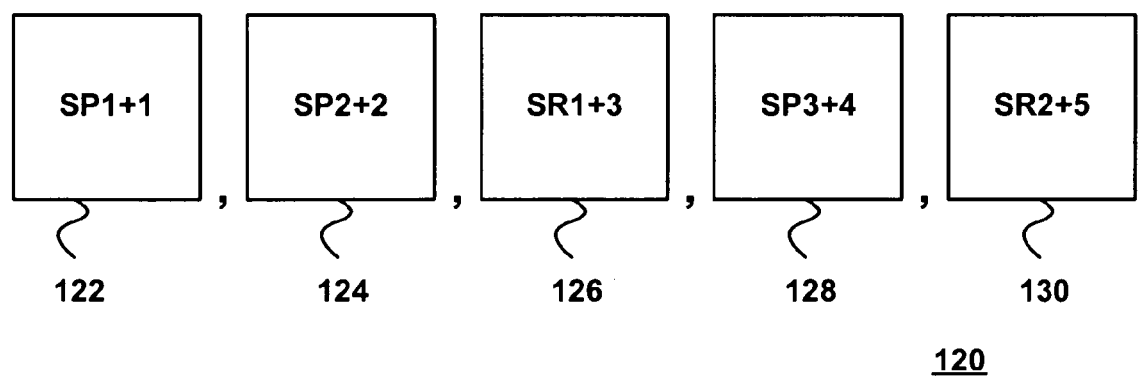
FIG. 2 shows an example of a message sequence that includes an incrementing integer.
Figure 3:
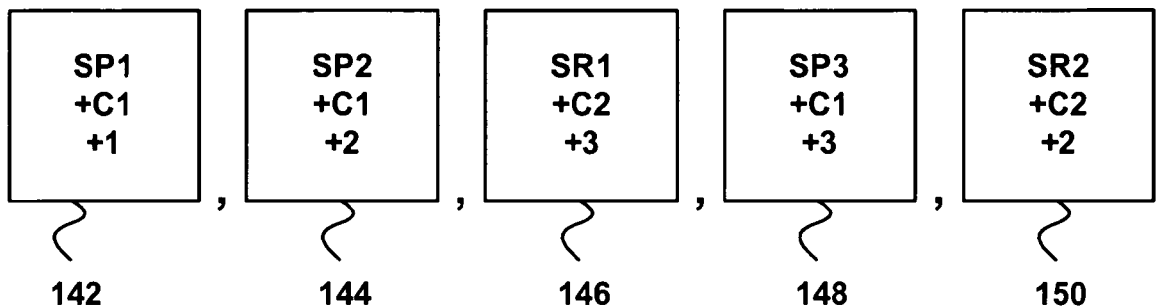
FIG. 3 shows an example of a message sequence that uses conversation ID's.
Figure 4:
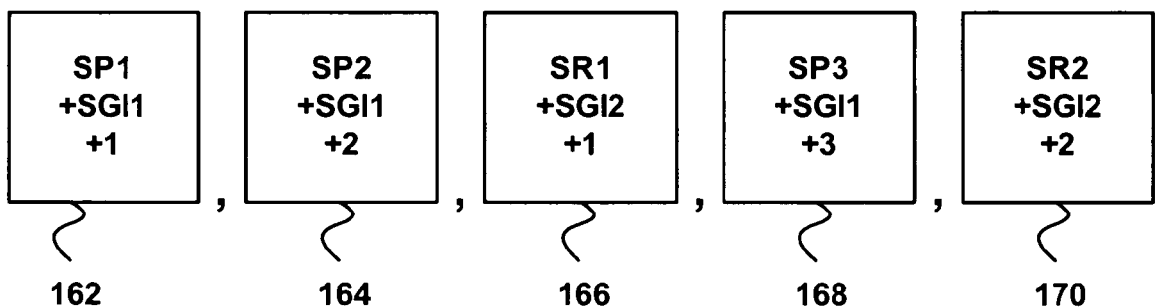
FIG. 4 shows an example of a message sequence that uses sequence group identifiers in accordance with an embodiment of the invention.

To solve this problem we give sequence groups, i.e. a group of messages that are to be processed in a specific order, their own context identifier which we refer to as a sequence group identifier (SGI). To use our original example of sender S and receiver R, their messages (162-170) would then appear in the message sequence 160 as shown in FIG. 4:

$$SP1+SGI1+1, SP2+SGI1+2, SR1+SGI2+1, SP3+SGI1+3, SR2+SGI2+2$$

where the value "+SGI+Y" in each message represents the SGI and sequence number. Unlike conversations which have to play double duty, serving both the needs conversations were originally intended to deal with, as well as message ordering, SGIs deal exclusively with message ordering and absolutely nothing else. Because users don't configure information at the message ordering level there are none of the previous described configuration problems, and if users do want to configure some information at the service group level it is much clearer what this would mean, since the service group is independent of any underlying services (in the sense of the Web Services definition language (WSDL)).

The first step in the SGI-based algorithm is establishing the SGI. The cheapest way to do this in terms of minimizing round trips is to let sender S create a SGI value and then send it to receiver R. R can check its SGI store, see that it hasn't seen this value previously, look at the sequence number, see that it is 0 (or whatever the starting number is) and realize it is dealing with a new sequence group. If desired then one can even put in an explicit flag saying "I am creating a new sequence group".

Where problems start is if a new sender S2 then shows up, and S2 also wants to create a sequence group, and S2 accidentally chooses the same value for its SGI as the original sender S chose. In theory this should not be a problem because the receiver R can record both the SGI and the sender, but in practice it is a problem because one of the main benefits of the new design is that it allows for SGIs whose scope includes more than two participants. In otherwords, if R sees the same SGI from two different S's then R must treat them as being for the same sequence group.

One solution to this problem is the use of Universally Unique Identifiers (UUIDs, also known as GUIDs). These are numbers that are sufficiently random so as to be unique. UUIDs are just one instance of this type of identifier, but there are others known to one skilled in the art. If all of the participants use this type of algorithm to generate their SGIs then the chance of two independently generated SGIs colliding is so small that in practice it can be ignored. So if S and S2 are both using a UUID type algorithm then we no longer need to worry about accidental collisions of SGI values. Now if R sees the same SGI from two senders (S, S2, etc.) it knows that they are indeed for the same sequence group.

A possible problem with allowing S to generate the SGI is that R may need to record its SGI values in a particular format that will work well with its database and routing infrastructure. Since S is unlikely to have any knowledge of this format the SGI it generates won't match that format. The way to solve this problem is to assign two SGIs to the same sequence group. This is possible by having S send a message to R saying "I am creating SGI value FOO" and then having R return a response saying "I am going to call the SGI value FOO by the name BAR". Subsequently, when S sends a message in the sequence group FOO it will also include the SGI BAR as a known alias. This allows S to track the sequence group by the ID it likes, FOO; and allows R to track the sequence group by the ID it likes, BAR.

Figure 5:
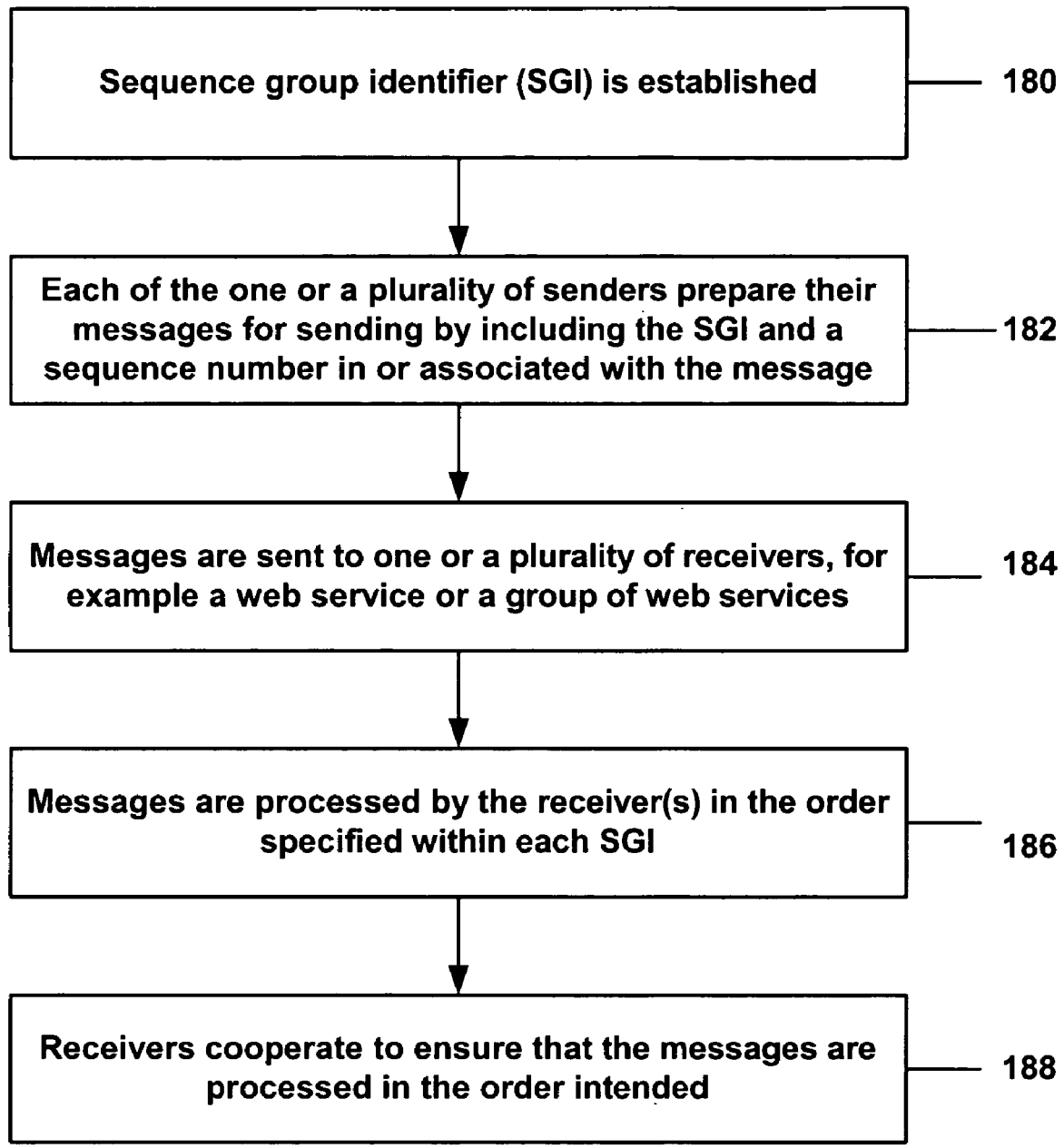
FIG. 5 shows a flowchart of a message sequence that uses sequence group identifiers in accordance with an embodiment of the invention.

FIG. 5 shows a flowchart of a message sequence or process 178 that uses sequence group identifiers in accordance with an embodiment of the invention. As shown in FIG. 5, in step 180 the sequence group identifier (SGI) is established. This may be as simple as allowing a first sender, for example a client, to specify the SGI, perhaps setting it at a value 0, or by assigning the SGI in another manner such as through the use of Universally Uniquie identifiers (UUIDs), or by cooperating between the sender and the receiver to decide upon an SGI. In step 182 each of the one or a plurality of senders prepare their messages for sending by including the SGI and a sequence number in or associated with the message. In alternate embodiments each of the senders may use an alias for the SGI that makes more sense to that particular sender. In step 184 the messages are sent to one or a plurality of receivers, for example a Web Service or a group of Web Services. In step 186 the messages are processed by the receiver(s) in the order specified within each SGI. In alternate embodiments each of the receivers may recognize an alias for the SGI that makes more sense to that particular receiver. If a plurality of receivers are specified and receive the messages, then in step 188 the receivers cooperate to ensure that the messages are processed in the order intended. This can be done either through a receiver-to-receiver communication, or through alternate means such as indicating a previous message destination within each new message. Since the SGI is independent of any conversation between a specific sender and a specific receiver, the process can span multiple senders and multiple receivers to ensure that messages are processed in the correct order by the relevant receivers.

Use of Algorithm with a Single Source

Figure 6:
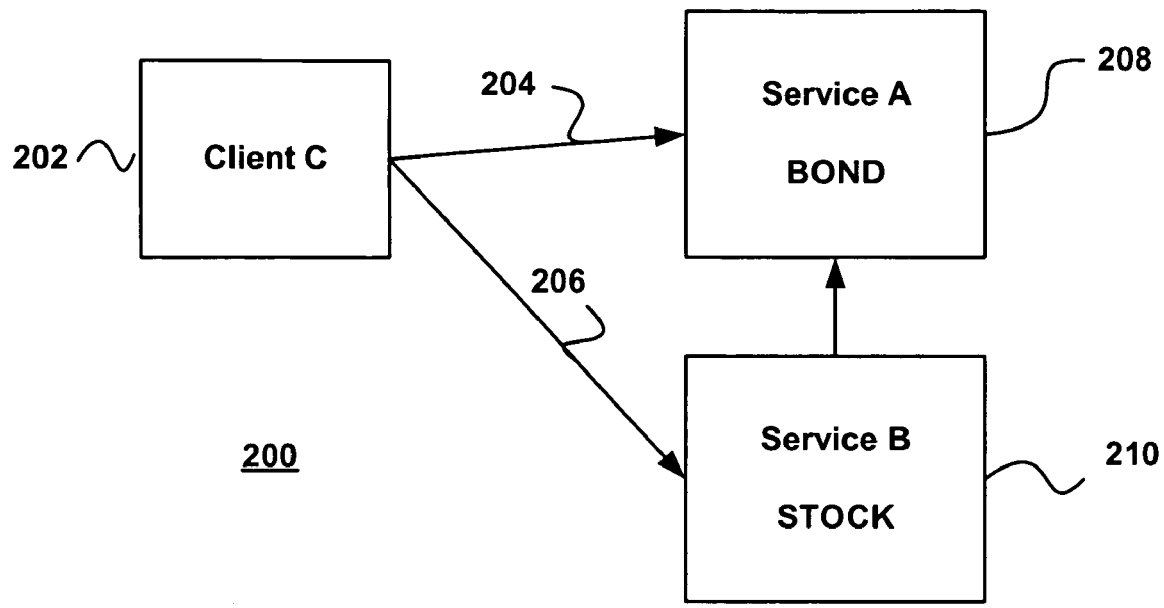
FIG. 6 shows an example of a system that uses sequence group identifiers in accordance with an embodiment of the invention.

To see how we might use sequence groups in a relatively simple case consider a trading corporation that handles requests to buy bonds and stocks. FIG. 6 shows an example of a system 200 that uses sequence group identifiers in accordance with an embodiment of the invention. The system includes two Web Services 208 and 210, in this example the BOND and STOCK Web Services, which accept orders 204, 206 to buy bonds and stocks respectively. A customer or client C 202 wants to issue an order for both bonds and stocks, but wants the orders to be executed in a particular sequence so as to not disturb the market (for example, if C were to buy a bunch of bonds and stocks from the same company at the same time then the market may bid up the price realizing that maybe C is trying to take over the company). Theoretically C could just send the orders out, one at a time, waiting for a response before sending out the next order but this may not work because market prices may change as it feeds the orders out one by one. What C ideally wants to do is send out all of its orders at once and just specify the order in which they are to be executed. But since the order involves purchasing both bonds and stocks it needs to have a sequence that reaches across both the BOND and STOCK Web Services.

The above problem is unsolvable with the traditional conversation-based message order model. With the traditional model, all one could do would be to introduce a new Web Service, e.g. BONDSTOCK, that could handle both types of orders. But the sequence group solution in accordance with the present invention can easily handle this scenario. Let us say that customer C wants to send out a sequenced order stream of the form: ST1, ST2, BO1, BO2, ST3, ST4 (wherein each of ST and BO corresponds to a stock or bond order respectively), i.e. C wants to buy two stocks, two bonds and then two more stocks. C would create a new SGI value (e.g. XYZ) and send out the request ST1+XYZ+0 to the STOCK Web Service. This message may also include a flag (although it doesn't have to) saying "I am a new SGI". C would then send out ST2+XYZ+1, also to STOCK.

The next message is where things get interesting because in accordance with our example the next message will be from customer C to yjr BOND Web Service, and will be of the form BO1+XYZ+2. In this case the BOND Web Service is receiving a message that is in the middle of a message order sequence whose earlier members were processed by the STOCK Web Service. This means that the second Web Service (BOND) cannot process the message without knowing if the first Web Service (STOCK) has processed the previous two messages.

Because STOCK and BOND are both Web Services from the same organization it is not unreasonable to assume that they are communicating with each other and so can inform each other of what messages they have processed. However this may be extremely expensive to implement in practice—it would require STOCK and BOND to have some shared infrastructure where they could do lookups of the form "Hey, somebody just sent me SGI XYZ with a sequence number 2, has anyone already processed sequence number 1?" If the answer is yes then BOND could proceed, if the answer is no then BOND has to wait until the agreed upon timeout and then fail the request. This is the same timeout feature described previously.

A simpler way to solve the problem of BOND needing to talk to STOCK is for C when it sends message BO1+XYZ+2 to BOND to also include within the message a pointer that says "I sent message XYZ+1 to STOCK", where STOCK would actually be the URI for the STOCK Web Service. This would let BOND know exactly who it has to ask in order to find out if message XYZ+1 was processed. It is possible to go even further and introduce a simple protocol that allows BOND to send a request to STOCK asking "Have you processed message XYZ+1?". By introducing a standard protocol one can enable arbitrary Web Services to interoperate and provide distributed message ordering semantics. What is especially nice about this solution is that it does not require a central coordinator.

Typically in distributed behavior systems there is some central coordinator who is arranging everything, but this isn't necessary with the above-described approach. Since all that matters is the question of 'has the previous message been processed?' it is easier to just let each service directly communicate with the service that had the previous message (which may actually be itself). Since there is no central source to overload this makes the algorithm very scalable.

Aliases

In accordance with embodiments of the invention, aliases can also be used in this context. For example, if the STOCK Web Service said that it wants to know the SGI XYZ by the name ABC then C could send its request to the BOND Web Service to say "I sent message XYZ+1 to STOCK who knows XYZ as ABC". This would then cause BOND to ask STOCK if it knows about message XYZ+1 whose alias at STOCK is ABC. This enables STOCK to process the request using a SGI value, ABC, that is easy for it to process. The pattern is then arbitrary extendable such that BOND could also assign its own alias to XYZ.

Sequencing Across Multiple Sources

Figure 7:
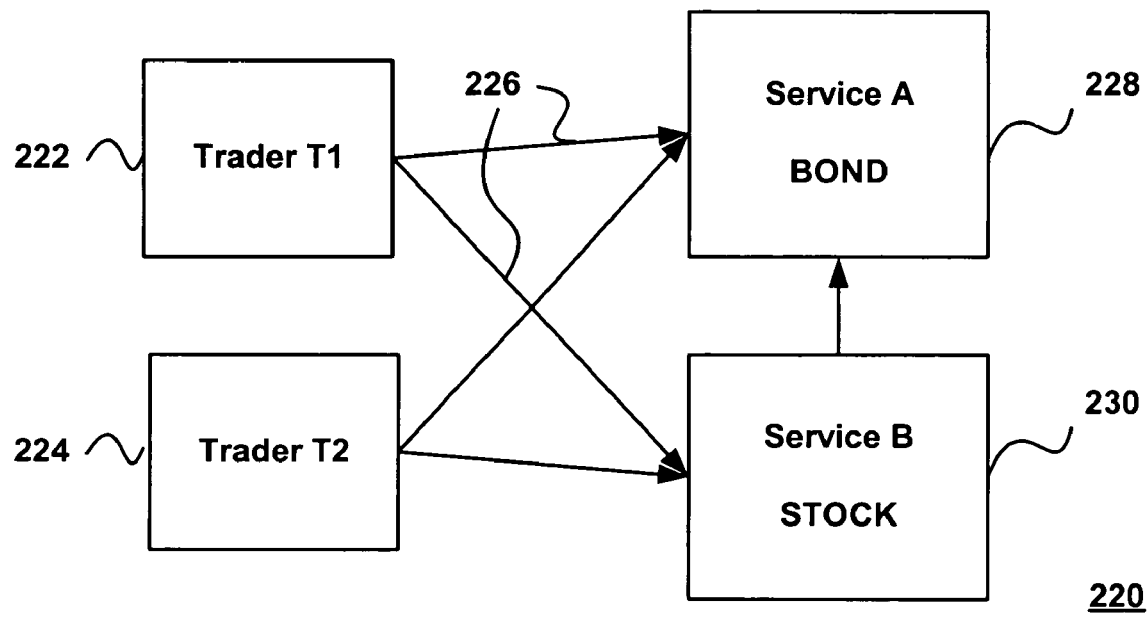
FIG. 7 shows an example of a system that uses sequence group identifiers with multiple sources and multiple receivers in accordance with an embodiment of the invention.

In the previous example, a single source was described sending messages out to one or more separate destinations. The next level of complexity is to allow for sequencing across multiple sources. FIG. 7 shows an example of a system 220 that uses sequence group identifiers with multiple sources 222,224 and multiple receivers 228,230, all of which are capable of communicating 226 with one another. In accordance with embodiments of the invention there are two general design patterns that can solve this problem—the relay race model or the sub-context model.

Multiple Source Relay Race Model

In the relay race model the right to issue a new message in a particular SGI is represented as a token that can be passed from one source to another. Consider the scenario shown in FIG. 7 in which two traders 222,224 (T1 and T2) are working together to make trades 226 with the STOCK 228 and the BOND 230 Web Services. The traders hand off to each other the right to send in orders and make sure their orders are sequenced in respect to each other. The transfer of the right can be either implicit or through an out-of-band mechanism in which case no special protocol elements are needed. The Web Services STOCK and BOND do not need to know about the actual agreement between the two traders, all they care about is the order specified by the SGI, and the SGI is independent of the source. For example, trader 1 could send message T1+XYZ+1 to BOND, and trader 2 could send T2+XYZ+2 to STOCK. The STOCK service will not process its message until BOND processes its message, even though the messages came from two different sources. The coordinating value is the SGI, not the sources of the messages.

It is possible to introduce an explicit protocol to allow for exchanging the 'token' between Trader 1 and Trader 2. If T1 starts with the token then T2 can request it and the request will either be accepted or denied. If T1 and T2 want to make sure there is no confusion then they can use a two-phase-commit protocol to handle the transfer. A lighter weight but slightly more complex solution is to use error handling in case there is a problem in transferring the token.

For example, let us say that T1 sends T1+XYZ+1 and T1+XYZ+2 to STOCK and T2, who thinks it has the token, sends T2+XYZ+2 to BOND. In this case BOND will contact STOCK (because T2 told BOND that XYZ+1 was processed by STOCK), see there is a collision (since the sequence number 2 has been used twice) and send an error. The key to making sure that errors will always be found is to make sure that any time more than one sender can send a message in a sequence group that all messages in the sequence group point to who was supposed to parse the previous message.

Even this solution will not always work exactly as expected. For example, let us say that T1 sends T1+XYZ+1, T1+XYZ+2 and T1+XYZ+3 to STOCK. After T1 sends T1+XYZ+1, then T2 thinks it has the token and sends T2+XYZ+2 and T2+XYZ+3 to BOND. Because all messages contain pointers to who was supposed to process the previous message, BOND, when it receives T2+XYZ+2, will contact STOCK and ask if XYZ+1 was processed because it is about to process XYZ+2. STOCK would then return an error saying 'Hey, wait, I already processed XYZ+2!' This would then cause BOND to reject T2+XYZ+2 as well as T2+XYZ+3. However T1+XYZ+2 and T1+XYZ+3 could still be processed. This is not an error, strictly speaking, but it may not be the desired behavior. One solution is to use a two-phase-commit protocol when handing off the right to generate new messages in the sequence group. Another enhancement is to allow the original sender to decide how to behave in the case that a collision occurs. In the previous example STOCK may already have processed messages T1+XYZ+2 and T1+XYZ+3 before it receives the check request from BOND that makes STOCK recognize that the XYZ+2 and XYZ+3 had also been generated by T2. In that case STOCK may want to contact T1 and say, effectively "There was a problem, T2 has also issued messages with XYZ+2 and XYZ+3, I have already processed the XYZ+2 and XYZ+3 message you have sent me, would you like me to try and rollback/compensate the affects of XYZ+2 and XYZ+3?" The choice of rollback/compensate will depend on the implementation of STOCK. An even simpler version of the previous is for STOCK to contact T1 and say "The collision has occurred" and nothing more then that. With this knowledge T1 may itself be able to take compensating action.

Multiple Source Sub-Context Model

The sub-context model is more flexible but less strict than the relay race model.

n the sub-context model the sender creates a new SGI (for example EFG) but predicates the execution of the message on the execution of another message in another SGI. For example, trader 2 could say 'Don't process T2+EFG+0 until you have processed T1+XYZ+2'. It would also be advisable to use pointers to say that T1+XYZ+2 was sent to STOCK. In this case the new SGI EFG is completely stand alone and so T1 and T2 don't need to coordinate. The only key is that T2 is placing a precondition on executing EFG+0 saying that XYZ+2 must have been processed first. Note that it is possible to have multiple pointers, e.g. a message could condition its execution on the success of more than one other message, for example, from multiple different sequence groups.

Each of the two models described above has its place. The relay race model is very useful when making sure that multiple possible senders operate in a specific sequence. The sub-context model is useful when one sender wants to predicate the execution of its messages based on the actions of another sender.

Message Ordering and Guarantees

Most traditional ordered messaging algorithms require that some sort of unique message ID be used in conjunction with message ordering. This is needed to catch certain corner cases. In accordance with an embodiment of the invention, the system or method may also make use of a unique message ID whose uniqueness qualities match those of the SGI. Whenever pointing to the previous message for purposes of guarantying distributed ordering it is critical to point to the full combination of SGI, sequence number and message ID. The SGI+sequence number are not by themselves enough to uniquely identify the message since due to rollover or reset the SGI+sequence number may not necessarily be unique.

It is possible to just use the message ID instead of the SGI+sequence number but in many cases it is worth also adding in the SGI+sequence number because this can help detect a round robin problem wherein the right to issue new messages in a particular sequence group is not handed off correctly.

Finally, there is an area of functionality that is often neglected in traditional message order implementations— what is the system's behavior if a message in a sequence should fail? For example, if a sender sends messages RTU+1 and RTU+2, and subsequently RTU+1 fails due to some application specific problem (for example, it asked to order 10 apples and there are only 5 in stock) should RTU+2 be processed? Typically one is not supposed to pipeline (i.e., send out without waiting for a response) non-idempotent messages such as these, so this scenario should not occur. If RTU+2 should not be executed unless RTU+1 succeeds then one should send out RTU+1, wait for the response and then send out RTU+2, but acting in this manner can have significant performance consequences. For example, consider a scenario in which a stock trader is sending in a carefully sequenced series of stock trades. If any one trade fails then the trader wants the rest of the sequence to not be executed. This is fundamentally different than a long running transaction in which the entire series of trades would either succeed or fail as a block. Instead this is a linear sequence where if a member in the sequence fails then subsequent members of the sequence will not be executed. If the stock trader uses the general rule of send request, wait for response, and then send the next request, then the trader could end up on the wrong side of market movements. While waiting for each individual trade to do a full round trip prices could change.

In accordance with an embodiment of the invention, the solution is to send the entire sequence of trades along with a flag that explains what to do should any of the messages generate an error. The flag can either specify to keep processing or state that any subsequent messages in that sequence group should be rejected. This feature also extends to the pointer feature, wherein a pointer can be qualified to specify if the previous message should have just been processed, must have failed, must have succeeded or must not have been processed yet. It is possible to imagine extending the pointer framework to be more generic. For example, one can make message execution contingent on the state of a previous message that wasn't necessarily even part of a sequence group.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a Web Services environment, the general principles and issues apply to any multi-hop message oriented network, and to other types of message-oriented services. It will also be evident that the complete system described above is complex may be implemented as a whole or in parts depending on the particular implementation. If, for example, all one needs is a simple message ordering between two senders on a single Web Service then one need only support the SGI+Sequence Number and reject any attempt to use pointers or to use the same SGI across multiple senders or even to accept the failure flag. Each feature can be added or rejected as needed, allowing one to decide exactly what feature/complexity trade-off one wishes to make. It will also be evident that while in certain examples described above only two senders or receivers are shown, the system and methods described herein are scalable to include any number of senders or receivers. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer system for message ordering in a message oriented network, independently of any conversation processing, comprising:
   a sender or a plurality of senders, that sends messages as a plurality of groups of messages, wherein each message within a particular group are to be processed in a particular order;
   a plurality of receivers, that receive the messages; and,
   wherein, for each group of messages that are to be processed in the particular order, each of said senders associate the messages in that group with both a sequence group identifier for that group, and a sequence number for that message; and
   wherein each of the receivers
      identifies messages having common sequence group identifiers, and then
      cooperates with other receivers to process those messages in the particular order, including confirming, prior to processing a message received in a group and having a particular sequence group identifier and sequence number combination, that a previous receiver has already one of received or processed a message having the same sequence group identifier and the preceding sequence number.

2. The computer system of claim 1 wherein the sender is a client of a server, and wherein the receiver or receivers are different services operating at said server.

3. The computer system of claim 1 wherein the receiver or receivers are Web Services adapted to receive messages from a sender.

4. The computer system of claim 1 wherein the system includes a plurality of senders and wherein a right to send a new message within a particular sequence group identifier is represented as a token that is passed from one sender to another sender, so that the sender with the token is the only sender currently allowed to send a message with that sequence group identifier.

5. The computer system of claim 1 wherein the sequence group identifier is specified by the sender.

6. The computer system of claim 1 wherein the sequence group identifier is randomly chosen as a universally unique identifier.

7. The computer system of claim 1 wherein the system includes a plurality of receivers and the plurality of receivers communicate amongst themselves to process the messages in the particular order including allowing a subsequent receiver to directly contact the previous receiver to confirm that the previous receiver has already processed the message it received having the same sequence group identifier and the preceding sequence number.

8. The computer system of claim 1 wherein the system includes a plurality of receivers and wherein each message includes a previous designation identifier listing the previous destination of a message in the sequence, and wherein the subsequent receiver of a message in the sequence can verify that the message has been processed at the previously designated receiver.

9. The computer system of claim 1 wherein the message may further include a sequence group identifier alias either at the sender or the receiver for use by that sender or receiver.

10. The computer system of claim 1 wherein the system includes a plurality of senders, and the senders use a multiple source relay process to determine which sender may send a new message in a specified SGI.

11. The computer system of claim 1 wherein the system includes a plurality of senders, and the senders use a multiple source sub-context model to determine which sender may send a new message in a specified SGI.

12. A method for message ordering in a message oriented network or system, independently of any conversation processing, comprising the steps of:
  establishing a sequence group identifier;
  preparing at each of one or a plurality of senders messages to be processed as a plurality of groups of messages, wherein each message within a particular group are to be processed in a particular order;
  sending the messages to one or a plurality of receivers; and
  receiving the messages at the one or a plurality of receivers and cooperating amongst the receivers to ensure that the messages are processed by the receivers in the order specified within each sequence group identifier, wherein each of the receivers
    identifies messages having common sequence group identifiers, and then
    cooperates with other receivers to process those messages in the particular order, including confirming, prior to processing a message received in a group and having a particular sequence group identifier and sequence number combination, that a previous receiver has already one of received or processed a message having the same sequence group identifier and the preceding sequence number.

13. The method of claim 12 wherein the sender is a client of a server, and wherein the receiver or receivers are different services operating at said server.

14. The method of claim 12 wherein the receiver or receivers are Web Services adapted to receive messages from a sender.

15. The method of claim 12 wherein the system includes a plurality of senders and wherein a right to send a new message within a particular sequence group identifier is represented as a token that is passed from one sender to another sender, so that the sender with the token is the only sender currently allowed to send a message with that sequence group identifier.

16. The method of claim 12 wherein the sequence group identifier is specified by the sender.

17. The method of claim 12 wherein the sequence group identifier is randomly chosen as a universally unique identifier.

18. The method of claim 12 wherein the system includes a plurality of receivers and the plurality of receivers communicate amongst themselves to process the messages in the particular order including allowing a subsequent receiver to directly contact the previous receiver to confirm that the previous receiver has already processed the message it received having the same sequence group identifier and the preceding sequence number.

19. The method of claim 12 wherein the system includes a plurality of receivers and wherein each message includes a previous designation identifier listing the previous destination of a message in the sequence, and wherein the subsequent receiver of a message in the sequence can verify that the message has been processed at the previously designated receiver.

20. The method of claim 12 wherein the message may further include a sequence group identifier alias either at the sender or the receiver for use by that sender or receiver.

21. The method of claim 12 wherein the system includes a plurality of senders, and the senders use a multiple source relay process to determine which sender may send a new message in a specified SGI.

22. The method of claim 12 wherein the system includes a plurality of senders, and the senders use a multiple source sub-context model to determine which sender may send a new message in a specified SGI.

23. A computer readable medium including instructions stored thereon which when executed cause the computer to perform the steps of:
  establishing a sequence group identifier;
  preparing at each of one or a plurality of senders messages to be processed as a plurality of groups of messages, wherein each message within a particular group are to be processed in a particular order;
  sending the messages to one or a plurality of receivers; and
  receiving the messages at the one or a plurality of receivers and cooperating amongst the receivers to ensure that the messages are processed by the receivers in the order specified within each sequence group identifier, wherein each of the receivers
    identifies messages having common sequence group identifiers, and then
    cooperates with other receivers to process those messages in the particular order, including confirming, prior to processing a message received in a group and having a particular sequence group identifier and sequence number combination, that a previous receiver has already one of received or processed a message having the same sequence group identifier and the preceding sequence number.

24. The computer readable medium of claim 23 wherein the sender is a client of a server, and wherein the receiver or receivers are different services operating at said server.

25. The computer readable medium of claim 23 wherein the receiver or receivers are Web Services adapted to receive messages from a sender.

26. The computer readable medium of claim 23 wherein the system includes a plurality of senders and wherein a right to send a new message within a particular sequence group identifier is represented as a token that is passed from one sender to another sender, so that the sender with the token is the only sender currently allowed to send a message with that sequence group identifier.

27. The computer readable medium of claim 23 wherein the sequence group identifier is specified by the sender.

28. The computer readable medium of claim 23 wherein the sequence group identifier is randomly chosen as a universally unique identifier.

29. The computer readable medium of claim 23 wherein the system includes a plurality of receivers and the plurality of receivers communicate amongst themselves to process the messages in the particular order including allowing a subsequent receiver to directly contact the previous receiver to confirm that the previous receiver has already processed the message it received having the same sequence group identifier and the preceding sequence number.

30. The computer readable medium of claim 23 wherein the system includes a plurality of receivers and wherein each message includes a previous designation identifier listing the previous destination of a message in the sequence, and wherein the subsequent receiver of a message in the sequence can verify that the message has been processed at the previously designated receiver.

31. The computer readable medium of claim 23 wherein the message may further include a sequence group identifier alias either at the sender or the receiver for use by that sender or receiver.

32. The computer readable medium of claim 23 wherein the system includes a plurality of senders, and the senders use a multiple source relay process to determine which sender may send a new message in a specified SGI.

33. The computer readable medium of claim 23 wherein the system includes a plurality of senders, and the senders use a multiple source sub-context model to determine which sender may send a new message in a specified SGI.

* * * * *

UNITED STATES PATENT AND TRADEMARK OFFICE
CERTIFICATE OF CORRECTION

PATENT NO. : 7,509,378 B2 Page 1 of 1
APPLICATION NO. : 10/796760
DATED : March 24, 2009
INVENTOR(S) : Goland It is certified that error appears in the above-identified patent and that said Letters Patent is hereby corrected as shown below:

In column 2, line 32, delete "specifyjust," and insert -- specify just, --, therefor.

In column 4, line 6, delete "Calculate Shipping Charges," and insert -- CalculateShippingCharges, --, therefor.

In column 4, line 18, delete "Sand" and insert -- S and --, therefor.

In column 5, line 11, delete "otherwords," and insert -- other words, --, therefor.

In column 5, line 47, delete "Uniquie" and insert -- Unique --, therefor.

In column 8, line 39, delete "3,1" and insert -- 3, I --, therefor.

In column 8, line 52, delete "n" and insert -- In --, therefor.

In column 10, line 58, in Claim 1, delete "message;" and insert -- message, --, therefor.

Signed and Sealed this

Twenty-fifth Day of May, 2010

David J. Kappos
*Director of the United States Patent and Trademark Office*